United States Patent [19]

Kadogaki

[11] Patent Number: 4,460,824
[45] Date of Patent: Jul. 17, 1984

[54] TEST REQUISITION CARD FOR AUTOMATIC ANALYZING APPARATUS

[75] Inventor: Tsuneaki Kadogaki, Tokyo, Japan
[73] Assignee: Olympus Optical Co. Ltd., Japan
[21] Appl. No.: 238,135
[22] Filed: Nov. 9, 1981

[30] Foreign Application Priority Data

Feb. 26, 1980 [JP] Japan .................................. 55-22177

[51] Int. Cl.³ .............................................. G06K 5/00
[52] U.S. Cl. .................... 235/375; 235/487; 364/413
[58] Field of Search ................ 235/487, 375, 381; 364/413, 415, 416; 73/53

[56] References Cited

U.S. PATENT DOCUMENTS

| | | | |
|---|---|---|---|
| 3,266,298 | 7/1963 | Whitehead et al. | 73/53 |
| 3,526,125 | 9/1970 | Gilford et al. | 73/53 |
| 3,656,473 | 4/1972 | Sodickson et al. | 128/2 R |
| 3,715,568 | 2/1973 | Azure, Jr. | 235/487 |
| 3,805,026 | 4/1974 | Anders | 235/487 |
| 3,848,112 | 11/1974 | Weichselbaum et al. | 235/375 |
| 4,303,854 | 12/1981 | Blankenhorn | 235/487 |
| 4,340,810 | 7/1982 | Glass | 235/375 |

Primary Examiner—A. D. Pellinen
Assistant Examiner—Robert Lev
Attorney, Agent, or Firm—Parkhurst & Oliff

[57] ABSTRACT

A test requisition card for an automatic analyzing apparatus characterized by a test requisition column, a test report column and an identification (ID) code label column having detachable and non-detachable sections. The test requisition column includes at least predetermined test items inscribed therein and given marks inscribed in given positions corresponding to the test items and operative to supply as an input the test items by means of a mark card reader to an automatic analyzing apparatus. The test report column is arranged in correspondence with the predetermined test items and positioned to receive thereon a print out of the test results of the test items corresponding to the marks inscribed on the card by means of the card printer of the automatic analyzing apparatus.

2 Claims, 6 Drawing Figures

TEST REQUISITION CARD FOR AUTOMATIC ANALYZING APPARATUS

BACKGROUND OF THE INVENTION

1. Field of the Invention

This invention relates to a test requisition card for automatic analyzing apparatus, which can automatically effect the chemical analysis of a test body such as blood, urine or the like.

2. Description of the Prior Art

Various types of automatic analyzing apparatus for automatically effecting the chemical analysis of a test body such as blood, urine or the like have heretofore been used in practice. In addition, various kinds of data systems for use in automatic analyzing apparatus have been used in conjunction with computers. For example, for a patient's data system, use has been made of a requisition card including a patient's information hand written therein as a locading list. In this system, a sample identification, that is, a sample ID is displayed so as to indicate the position of a sample set in the automatic analyzing apparatus. This system functions to deliver the analytical result reports in response to the loading list order. The output is transferred into a loading list requisition card or a patient's information or requisition card which is then written into the analytical result report, thereby preparing a final result report.

In such patient data systems, it is necessary to transfer the analytical result report to the requisition card or transfer the patient's information to the analytical result report. In addition, if a sample is extracted or added or if an urgent sample is inserted between two other samples, the relation between the analytical result report and the loading list becomes unreliable, thereby inducing the following errors wherein:

(a) The patient's name does not coincide with the identification number (ID No.)

(b) The patient's information or the analytical result report is not correctly transferred.

(c) An erroneous sample is taken for the ID No.

(d) The sample coincides with the ID No., but the patient's name does not coincide with the ID No.

Another patient data system which can load the patient's information into a computer memory and can print out the patient's information together with the analytical result report has also been proposed. In this system, the patient's information is manually supplied as an input by means of a key board, and as a result, this system can result in frequent load miss.

A further patient data system which can directly load an analytical information from a requisition card to a computer memory has been proposed. In this system, the sample ID and the patient's name are manually checked with each other. As a result, this system tends to induce the above mentioned errors (a) to (d).

SUMMARY OF THE INVENTION

An object of the invention, therefore, is to provide a test requisition or information card for automatic analyzing apparatus, which can eliminate the various drawbacks which have been encountered with the prior art techniques. The instant invention makes a test requisition column integral with a test report column, and can directly supply a patient's information inscribed in the test requisition column as an input to an automatic analyzing apparatus and can subsequently directly print out the analytical result in the test report column.

A feature of the invention is the provision of a test requisition or information card for automatic analyzing apparatus comprising a test requisition column including predetermined test items inscribed thereon and marks inscribed in given positions corresponding to said test items and said marks functioning as an input when said test items are read by means of a mark card reader interval with an automatic analyzing apparatus; a test report column arranged in correspondence with said predetermined test items and operating to receive the test results of the test item with said mark inscribed therein by means of a card printer of the automatic analyzing apparatus; and an identification (ID) code label column including a detachable ID code label for the purpose of adhering said label onto at least sample cup or the like prior to insertion in the automatic analyzing apparatus and a non-detachable ID code label which is the same as said detachable ID code label.

Further objects and features of the invention will be fully understood from the following detailed description with reference to the accompanying drawings, wherein:

DETAILED DESCRIPTION OF THE PREFERRED EMBODIMENTS

Figure 1:
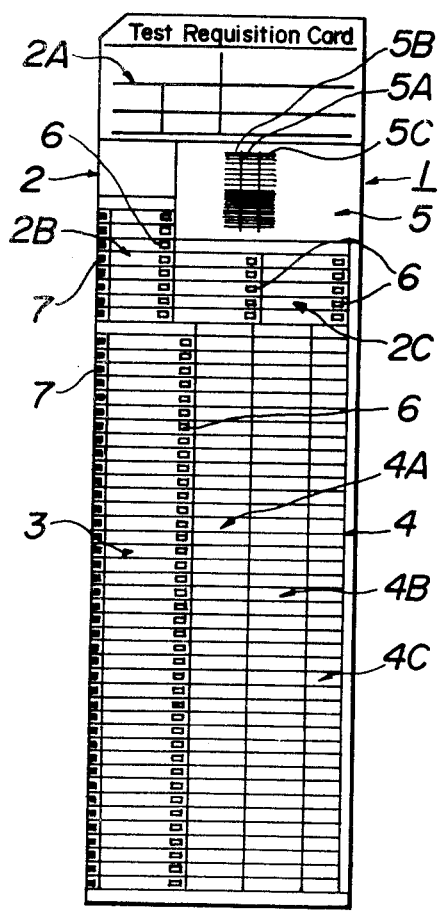
FIG. 1 is a plan view of one embodiment of a test requisition or information card for automatic analyzing apparatus according to the invention.

FIG. 1 shows one embodiment of a test requisition or information card for automatic analyzing apparatus according to the invention. In FIG. 1, reference numeral 1 designates a test requisition or information card. The test requisition or information card 1 is composed of one card which is provided thereon with a test requisition column 2, a test (measurement) item's name column 3, a test report column 4 and an identification code label column 5. The test requisition column 2 comprises: a patient's name or the like information column 2A in which are inscribed patient's name, age, test date, patient's number, and patient's attending physician's name, a patient's information column 2B in which are printed information items such as patient's sex, age, nature of the test, whether routine test, urgent test or the like (8 items are shown in the present embodiment); and a measurement information column 2C in which are printed the kinds of the items to be tested such as the number, symbol or ability test name (for example, liver ability test, kidney ability test or the like) or the like of the group selected for determining a separation test (measurement) item (10 items are shown in the present embodiment). In the patient's information column 2B and measurement information column 2C are printed frames 6 which are arranged at given positions each corresponding to each information item and each test item kind printed in the patient's information column 2B and measurement information column 2C, respectively. If the frames 6 corresponding to the information classification items and test item kinds are made black in color by a pencil or the like, it is possible to supply the information classification items and test item kinds as an input by means of a mark card reader to an automatic analyzing apparatus.

The test item's name is printed in column 3. Each, kind of measurement items and any other measurement items are printed in the measurement information column 2C (40 items are shown in the present embodiment). In the test item's name column 3 are also printed frames 6 in given positions each corresponding to each item in the same manner as mentioned above. If the frames 6 corresponding to the measurement items concerned are made black in color by a pencil or the like it is possible to supply the measurement item concerned as an input by means of the mark card reader to the automatic analyzing apparatus. The test items corresponding to the test item kinds specified by the measurement information column 2C are not required to be specified by the test item's name column 3.

The test report column 4 is arranged adjacent to the test item's name column 3 and composed of a normal value range column 4A in which are prescribed the normal value range corresponding to each test item's name, measurement result and decision thereon or the like, a measurement result data column 4B and a measurement result symbol column 4C. In the normal value range column 4A are printed beforehand the normal value range of all test items printed in the test item's name column 3. Alternatively, the normal value range of all test items may be printed out thereon by means of a card printer or the normal value range of the test items corresponding to the kinds specified by the measurement information column 2C and the test items only belonging to any other items and specified by the test item's name column 3 may be printed out thereon by means of the card printer. The measurement result data column 4B are printed out by means of a card printer of an automatic analyzing apparatus with the resulting measurements from the test items corresponding to the specified measurement information of column 2C and the test item specified by the test item's name column 3. The measurement results are printed out in column 4C by means of a card printer of an automatic analyzing apparatus. A symbol of determination or the like with respect to the measurement result, for example, a symbol that whether the measurement result is higher or lower than the normal value range or a symbol that the measurement becomes abnormal due to the fact that the measurement result exceeds the measurement range or the like can also be printed thereon.

On the ID code label column 5 is firmly attached an ID code label 5A composed of bar codes. Two detachable ID code labels 5B, 5C which are the same as the ID code label 5A can be adhered on a sample cup or the like of the automatic analyzing apparatus.

In addition, the test requisition or information card 1 has along one side edge marks 7 printed beforehand thereon for the purpose of determining the position and timing when the mark card reader of the automatic analyzing apparatus functions to discriminate the frames 6 provided in the patient's information column 2B, measurement information column 2C and test item's name column 3, respectively, one from the other.

Figure 2:
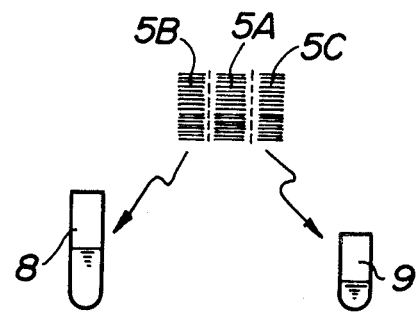
FIG. 2 is a diagrammatic view illustrating the mode of adhering identification (ID) code labels onto blood sample cups.

The mode of using the test requisition card according to the invention shown in FIG. 1 will now be described with reference to FIGS. 2 to 4.

(1) In the first place, an applicant for the test requisition inscribes necessary items in the patient's name or the like information column 2A and marks the frames 6 concerned in the patient information column 2B, measurement information column 2C and test item's name column 3.

(2) In a test room, before or after the blood sampling, one of the detachable ID code labels 5B is cut and separated from the ID code label column 5 and adhered to a blood sample cup 8. The blood sample cup 8 is subjected to centrifuge and the serum thus obtained is transferred into a serum distribution sample cup 9 of the automatic analyzing apparatus. The sample cup 9 is then identified with the other removable ID code label 5C. As a result, the ID code label 5A only non-removably adhered onto the ID code label column 5 of the test requisition card 1 remains thereon.

Figure 3:
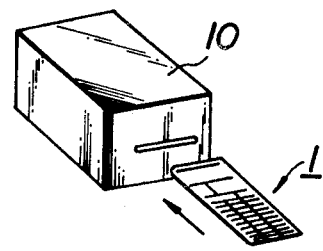
FIG. 3 is a perspective view illustrating the mode of supplying ID codes and information such as measurement items or the like as an input into an automatic analyzing apparatus by inserting a test requisition card into a card reader printer of the automatic analyzing apparatus.

(3) Subsequently, the test requisition card 1 is inserted into a card reader or card reader printer 10 of an automatic analyzing apparatus as shown in FIG. 3 so as to supply the ID codes together with the information such as the measurement items or the like as an input to the automatic analyzing apparatus.

Figure 4:
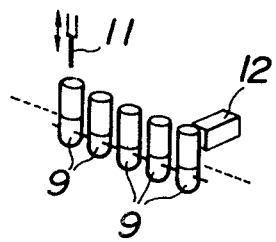
FIG. 4 is a perspective view of a series of sample cups, a sample distributor and an ID code reader.

(4) Prior to distribution of the test body into a reaction tube or the like by means of a distributor 11 of the automatic analyzing apparatus as shown in FIG. 4, the ID code adhered onto the sample cup 9 is read by an ID code reader 12. Then, the test body is analyzed in accordance with the measurement information of the ID code which has been read and memorized by the card reader 10 as shown in FIG. 3.

(5) After the required analysis has been completed, the measurement results and the symbol of the decision thereof or the like are printed out on the measurement result data column 4B and measurement result symbol column 4C, respectively.

As stated hereinbefore, the test requisition or information card 1 according to the invention has a number of advantages. In the first place, the measurement items or the like inscribed in the requisition or information card 1 by the test applicant can be supplied as an input by means of the card reader to the automatic analyzing apparatus, so that there is no erroneous transfer of the items, and that the test can be effected in an easy and less expensive manner. Secondly, the requisition or information card is made integral with the report format and as a result, the test applicant can easily determine whether or not the requisition item is analyzed. Third, use is made of the ID card, so that the input into the test requisition card and test of the test body may be effected not in order and hence the urgent sample can easily be inserted between two adjacent samples. Finally, if electronic data processing is effected at the physician's accountant window, it is possible to immediately decide the number of test points.

Figure 5:
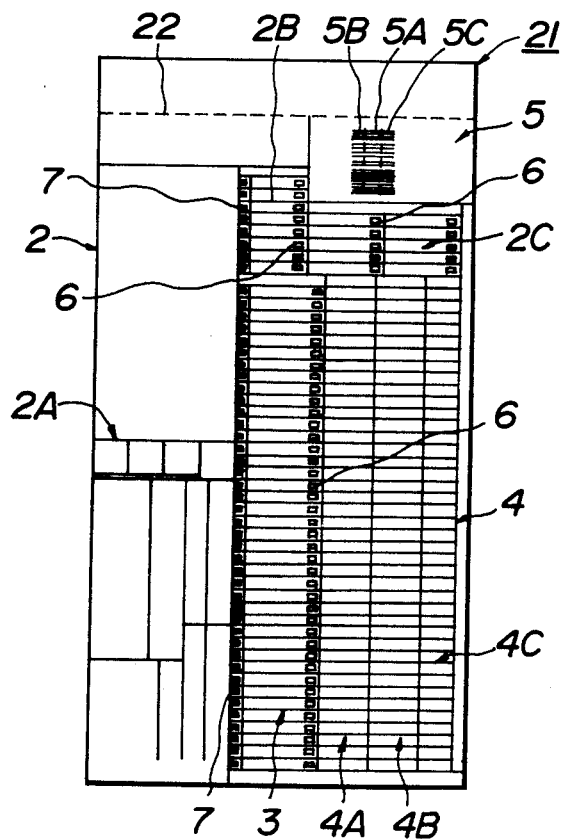
FIG. 5 is a plan view of another embodiment of a test requisition or information card for automatic analyzing apparatus according to the invention.
Figure 6:
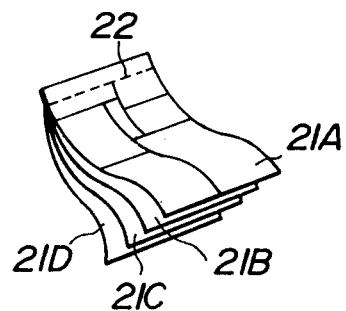
FIG. 6 is a perspective view illustrating the mode of using the test requisition or information card shown in FIG. 5.

FIG. 5 shows another embodiment of a test requisition or information card for automatic analyzing apparatus according to the invention. In FIG. 5, reference numeral 21 designates a test requisition or information card. The test requisition or information card 21 shown in FIG. 5 is different from that shown in FIG. 1 that the patient's name or the like information is located in column 2A at one side of the card 1 such that the items can be hand written thereinto or can directly be inscribed with the aid of embossed cards of the patient, patient's attending physician and testers and that the card 21 is provided at its upper portion with a tear-away line 22 as shown by dotted lines. As shown in FIG. 6, four cards 21A, 21B, 21C and 21D are bound together at respective upper portions such that each of these cards can be cut and separated at the tear-away line 22 and that a carbon paper is inserted between the cards or each card is composed of no carbon paper so as to simultaneously print various kinds of specific information or analytical results or the like. As a result, after the test applicant has inscribed the necessary items in the card 21, one of the cards, for example, 21A can be cut and separated and remain as a copy at his hands. The other cards 21B, 21C and 21D are delivered to the test room where the card 21B is cut and separated and remained as a copy at the test room. The remaining cards 2C and 2D are delivered to the test applicant and the physician's accountant, respectively. The test requisition or information card shown in FIGS. 5 and 6 has the advantages which are the same as those of the previous embodiment. In addition, even when one of the cards is lost, the remaining card may be used at one's disposal. The use of the embossed card ensures a simultaneous inscription of the items required in the patient's name or the like information column 2A in each card and provides the important advantage that the card can be used in a simple and reliable manner. In the present embodiment, it is preferable to attach ID code labels 5A, 5B and 5C to the ID code label of column 5 of the card 21B to be remained in the test room.

The invention is not limited to the above described embodiments only, but various changes and alternations may be possible. For example, if respective test items are specified by the test item's name in column 3, then it is not always necessary to provide the measurement information column 2C. In addition, provision may be made of the normal value range column 4A and measurement result symbol column 4C need only be used when these columns are required.

As stated hereinbefore, in the test requisition or information card for automatic analyzing apparatus according to the invention, the test requisition or information card is made integral with the test report and the test requisition information and test result data are supplied as the input by means of the card reader and card printer to the automatic analyzing apparatus and delivered as the output therefrom. As a result, the patient's name is always made integral with the ID code, thereby eliminating the drawback of the conventional test requisition card wherein the patient's name does not necessarily coincide with the ID number.

What is claimed is:

1. An information card for an automatic analyzing apparatus comprising:
   a sheet-like member;
   a test requisition column array on said sheet-like member with spaces for patient information and test items to be recorded thereon in machine-readable form;
   a test report column array on said sheet-like member with spaces for test results derived from an automatic analyzing apparatus to be recorded thereon;
   an identification code label means comprising:
   a non-detachable label for bearing a patient identifying code secured to said sheet-like member, and
   a detachable label for bearing a patient identifying code secured to said sheet-like member and means for adhering said detachable label onto a container containing a sample derived from said patient; and
   a perforation line to facilitate separation of said non-detachable label from said detachable label.

2. An information card according to claim 1, wherein said non-detachable and detachable labels contain bar codes comprising bar-shaped marks extending perpendicularly to said perforation line.

* * * * *